(12) United States Patent
Taniguchi et al.

(10) Patent No.: US 10,464,615 B2
(45) Date of Patent: Nov. 5, 2019

(54) PANEL MEMBER FOR AUTOMOBILE

(71) Applicant: TOYOTA JIDOSHA KABUSHIKI KAISHA, Toyota-shi (JP)

(72) Inventors: Satoshi Taniguchi, Okazaki (JP); Hiroto Usui, Nagoya (JP); Shunsuke Miyagawa, Toyota (JP); Satoshi Yamazaki, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 38 days.

(21) Appl. No.: 15/860,764

(22) Filed: Jan. 3, 2018

(65) Prior Publication Data

US 2018/0244322 A1 Aug. 30, 2018

(30) Foreign Application Priority Data

Feb. 27, 2017 (JP) ................................ 2017-035202

(51) Int. Cl.
| | |
|---|---|
| *B62D 27/00* | (2006.01) |
| *B62D 27/02* | (2006.01) |
| *C21D 10/00* | (2006.01) |
| *B62D 29/00* | (2006.01) |
| *B62D 25/20* | (2006.01) |

(52) U.S. Cl.
CPC ......... *B62D 27/023* (2013.01); *B62D 29/007* (2013.01); *C21D 10/005* (2013.01); *B62D 25/20* (2013.01); *C21D 2221/00* (2013.01)

(58) Field of Classification Search
CPC .... B62D 27/023; B62D 52/20; B62D 29/007; C21D 10/005; C21D 2221/00
See application file for complete search history.

(56) References Cited

U.S. PATENT DOCUMENTS 8,387,852 B2 * 3/2013 Bevans .............. B23K 20/1225
228/112.1
2018/0099700 A1 4/2018 Daigaku

FOREIGN PATENT DOCUMENTS

| JP | H 04-72010 A | 3/1992 |
|---|---|---|
| JP | H 11-21633 A | 1/1999 |
| JP | 2007-283339 A | 11/2007 |
| JP | 2015-16486 | 1/2015 |
| WO | 2016/133210 A1 | 8/2016 |

* cited by examiner

*Primary Examiner* — Lori L Lyjak
(74) *Attorney, Agent, or Firm* — Oblon, McClelland, Maier & Neustadt, L.L.P.

(57) ABSTRACT

A panel member for an automobile has: a first plate member; a second plate member joined to the first plate member via a first joining portion in a state of being adjacent to the first plate member, a tensile strength of the second plate member is lower than a tensile strength of the first plate member; one or more third plate members joined to the first plate member and the second plate member via a second joining portion that intersects the first joining portion in a state of being adjacent to the first plate member and the second plate member; and a high strength portion that is provided at the second plate member, and that includes a peak portion including the first joining portion and the second joining portion, a tensile strength of the high strength portion being higher than the tensile strength of the second plate member.

11 Claims, 7 Drawing Sheets

PANEL MEMBER FOR AUTOMOBILE

CROSS-REFERENCE TO RELATED APPLICATION

This application claims priority under 35 USC 119 from Japanese Patent Application No. 2017-035202 filed Feb. 27, 2017, the disclosure of which is incorporated by reference herein.

BACKGROUND

Technical Field

The present invention relates to a panel member for an automobile.

Japanese Patent Application Laid-Open (JP-A) No. 2015-016486 discloses, in a panel member that is structured by two steel plates (plate members) of different plate thicknesses being butt welded together in an L-shape, a backward L-shape or a substantial U-shape, a technique that has a welding line corner portion at the corner portion of welding lines formed by the butt welding, and of setting hardened lines by a laser at the thinner plate in a radial form from this welding line corner portion. Due thereto, the strength of this thinner steel plate is improved, and breakage (cracking) arising at the thinner steel plate at the time of forming by press working is suppressed.

However, in JP-A No. 2015-016486, two steel plates that have different plate thicknesses are joined together. Therefore, for example, in a case in which three or more steel plates, which include two or more types of steel plates whose tensile strengths differ, are joined together, even if laser hardening is carried out in a radial form from the welding line corner portion at the steel plate having the lowest tensile strength (hereinafter called "low strength plate member"), there is the possibility that breakage (cracking) will arise at the low strength plate member at the time of stamping due to the effects of the other two steel plates whose tensile strengths are higher than that of the low strength plate member.

SUMMARY

The present invention provides a panel member for an automobile in which, even if three or more plate members, which include two types of plate members having different tensile strengths, are joined together, breakage (cracking) at the time of stamping at a low strength plate member that has a low tensile strength can be suppressed.

A panel member for an automobile of a first aspect of the present invention has: a first plate member that is made of metal; a second plate member that is made of metal, and is joined to the first plate member via a first joining portion in a state of being adjacent to the first plate member, a tensile strength of the second plate member being lower than a tensile strength of the first plate member; one or more third plate members that are made of metal, and that are joined to the first plate member and the second plate member via a second joining portion that intersects the first joining portion in a state of being adjacent to the first plate member and the second plate member; and a high strength portion that is provided at the second plate member, and that includes a peak portion including the first joining portion and the second joining portion, a tensile strength of the high strength portion being higher than the tensile strength of the second plate member.

In the first aspect, the first plate member that is made of metal and the second plate member, which is made of metal and whose tensile strength is lower than that of the first plate member, are joined via the first joining portion in a state of being adjacent to one another. Further, in the state in which the first plate member and the second plate member are adjacent to one another, the one or more third plate members that are made of metal are joined to the first plate member and the second plate member via the second joining portion that intersects the first joining portion. Further, at the second plate member, the high strength portion, whose tensile strength is higher than the tensile strength of the second plate member, is provided at the peak portion that includes the first joining portion and the second joining portion.

Generally, in a case of tensing, under the same conditions, plate members that have different tensile strengths, the amount of elongation of the plate member whose tensile strength is low is greater than that of the plate member whose tensile strength is high. On the basis thereof, a case is considered in which, at a panel member for an automobile (hereinafter simply called "panel member") for example, a first plate member and a second plate member that are disposed adjacent to one another and whose tensile strengths differ from one another (tensile strength: first plate member>second plate member), and another third plate member, are joined together in a trifurcated shape in a state of abutting one another.

In this case, when tensile force is applied along the direction orthogonal to the arrayed direction of the first plate member and the second plate member that are disposed adjacent to one another, at the second joining portion where the first plate member and the second plate member are joined to the third plate member, due to the difference in the amounts of elongation of the first plate member and the second plate member, the position of the second joining portion, that joins the first plate member and the third plate member, and the position of the second joining portion, that joins the second plate member and the third plate member, become offset in the direction of tensing. As a result, the panel member deforms in an S-shape. Namely, the formability of the panel member deteriorates at the time of stamping (the time of forming by press working).

Further, at the panel member, in a case in which the position of the second joining portion, that joins the first plate member and the third plate member, and the position of the second joining portion, that joins the second plate member and the third plate member, become offset in the direction of tensing, the peak portion at the second plate member side is the starting point of the position of the second joining portion becoming offset in the direction of tensing. Therefore, at the peak portion side of the second plate member that is a plate member of a lower strength than the first plate member, at the time of stamping of the panel member, stress concentrates, and there are cases in which local elongation (contraction) and breakage (cracking) arise.

In contrast, in the present invention, the high strength portion is provided at the peak portion of the second plate member that includes the first joining portion, at which the first plate member and the second plate member that have different tensile strengths are joined, and the second joining portion at which the first plate member and the second plate member are joined with the third plate member. Due thereto, at the three types of plate members including the second plate member whose tensile strength is lower than that of the first plate member, the peak portion of the second plate member where stress concentrates at the time of stamping the panel member and the like is reinforced, and optimization of the balance of strength is achieved.

Accordingly, at the panel member of the present invention, by reinforcing the peak portion of the second plate member that is the starting point of the offset in the direction of tensing between the first plate member and the second plate member, the amount of extension at the second plate member can be made to be small as compared with a case in which a high strength portion is not provided at the second plate member. As a result, the amount of deformation at the panel member can be made to be small, the concentration of stress that is applied to second plate member can be mitigated, and breakage (cracking) at the time of stamping can be suppressed at the panel member.

Note that "at the second plate member at a peak portion that includes the first joining portion and the second joining portion" here includes the point of intersection (the vertex of the second plate member) of the first joining portion and the second joining portion, and the peripheral portion thereof, at the second plate member.

In a panel member for an automobile of a second aspect of the present invention, in the first aspect, the high strength portion that includes the peak portion is formed in a triangular shape.

When tensile force is applied to the panel member, at the second plate member, stress concentrates in particular at the peak portion where plate members that have different rates of elongation abut one another.

Therefore, in the second aspect, due to the high strength portion including the peak portion of the second plate member and being formed in a triangular shape, the region, where stress concentrates in particular at the time when tensile force is applied to the panel member, is reinforced, and, at the panel member, breakage (cracking) that arises at the time of stamping can be suppressed effectively.

In a panel member for an automobile of a third aspect of the present invention, in the first aspect or the second aspect, the high strength portion is a laser hardened portion that is hardened by a laser.

In the third aspect, hardening can be carried out at the needed region by forming the high strength portion by laser hardening.

In a panel member for an automobile of a fourth aspect of the present invention, in the third aspect, the laser hardened portion includes a first laser hardened line that is formed along a direction intersecting the first joining portion and the second joining portion.

In the fourth aspect, due to the first laser hardened line being formed along a direction intersecting the first joining portion and the second joining portion, at the peak portion of the second plate member, elongation in the direction along the first joining portion and the second joining portion at the time of stamping can be suppressed via the first joining portion and the second joining portion. Due thereto, the amount of deformation at the panel member can be made to be small, and, at the peak portion of the second plate member, a concentration of stress at the time of stamping can be mitigated, and breakage (cracking) can be suppressed.

In a panel member for an automobile of a fifth aspect of the present invention, in the third aspect, the laser hardened portion includes a second laser hardened line that intersects the first joining portion and is parallel to the second joining portion.

In the fifth aspect, the second laser hardened line intersects the first joining portion and is formed parallel to the second joining portion. By forming the second laser hardened lines in this way along a direction intersecting the first joining portion, at the peak portion of the second plate member, elongation in the direction along the first joining portion can be suppressed via the first joining portion at the time of stamping. Moreover, due to the second laser hardened lines being formed parallel to the second joining portion, at the peak portion itself of the second plate member, elongation in the direction along the first joining portion can be suppressed.

In a panel member for an automobile of a sixth aspect of the present invention, in the first aspect or the second aspect, at the high strength portion, a reinforcing plate member, whose tensile strength is higher than the tensile strength of the second plate member, is joined to the second plate member.

In the sixth aspect, due to the reinforcing plate member, whose tensile strength is higher than the tensile strength of the second plate member, being joined to the peak portion of the second plate member, the strength of the peak portion of the second plate member is increased. Accordingly, at the peak portion of the second plate member, a concentration of stress at the time of stamping is mitigated. Here, as the "reinforcing plate member", a reinforcing member may be joined to the second plate member in a state in which the peak portion of the second plate member is cut down, or a reinforcing plate member may be joined so as to be superposed on the peak portion of the second plate member.

BRIEF DESCRIPTION OF THE DRAWINGS

Exemplary embodiments of the present invention will be described in detail based on the following figures, wherein.

DETAILED DESCRIPTION

An embodiment of a panel member for an automobile relating to the present invention is described hereinafter by using the drawings. Note that, for convenience of explanation, arrow FR that is shown appropriately in these drawings indicates the front side in the front-rear direction of the panel member for an automobile, arrow RH indicates the right side in the transverse direction of the panel member for an automobile, and arrow LH indicates the left side in the transverse direction of the panel member for an automobile.

(Structure of Panel Member for Automobile)

Figure 1:
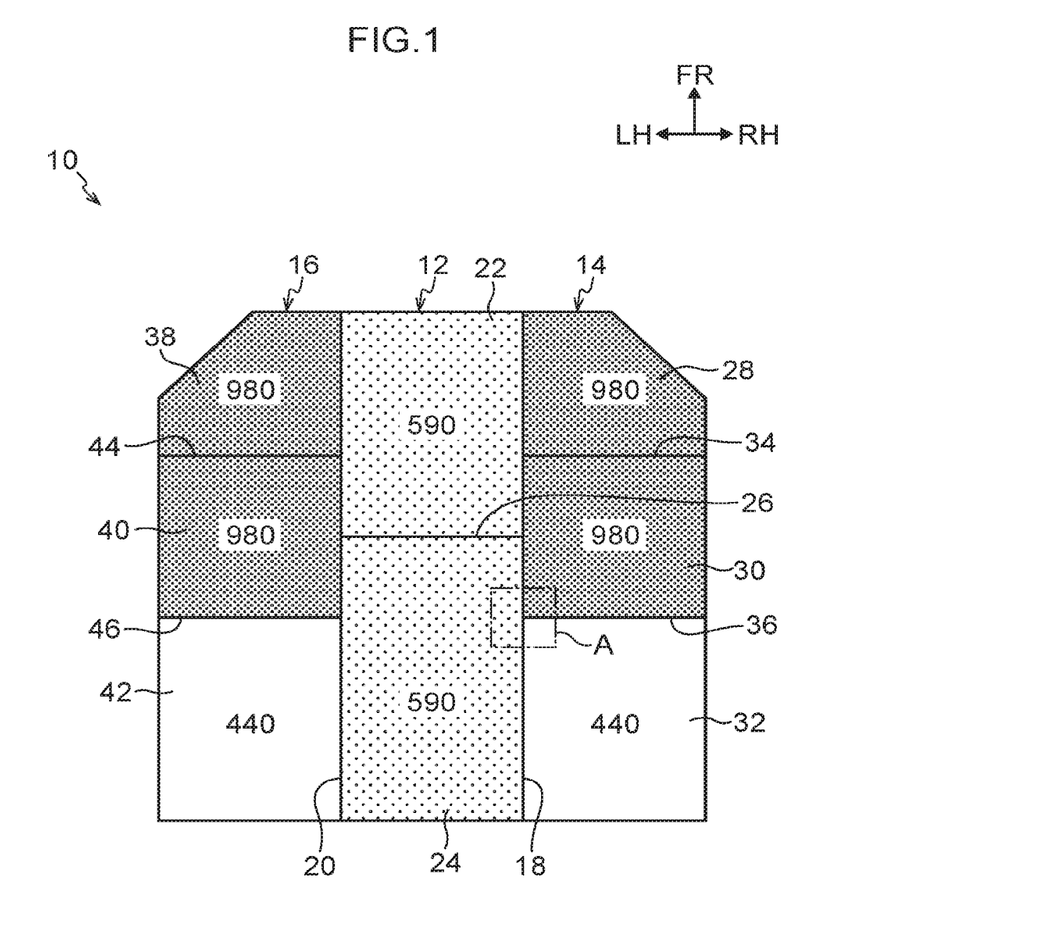
FIG. 1 is a plan view showing a panel member for an automobile relating to a present embodiment.

A plan view of a panel member 10 for an automobile (hereinafter simply called "panel member") relating to the present embodiment is shown in FIG. 1. The panel member 10 shown in FIG. 1 is divided into, for example, a central portion 12, a right side portion 14, and a left side portion 16 in the transverse direction of the panel member 10. The central portion 12 and the right side portion 14, and the central portion 12 and the left side portion 16, are respectively joined together (as will be described later) and made integral in the transverse direction of the panel member 10 by tailored blanking.

Generally, tailored blanking is a method of welding (joining) together plural metal plates (blank members), which are different materials or have different plate thicknesses, by laser welding or the like, and making them into a single metal plate. For example, by welding plate members of different materials together and making them integral, there is the feature that the mechanical characteristics of one sheet of materials can be made to vary locally. Further, by welding plate members of different plate thicknesses together and making them integral, the rigidity can be varied locally.

The structure of the panel member 10 is described briefly here.

As shown in FIG. 1, at the central portion 12 in the transverse direction of the panel member 10, a front portion 22 and a rear portion (third plate member) 24 are disposed adjacent to one another along the front-rear direction of the panel member 10. High tension steel plates whose tensile strengths are 590 MPa for example (so-called "590 materials") are used as the front portion 22 and the rear portion 24. The front portion 22 and the rear portion 24 are joined via a same material joining portion 26. Note that "same material joining portion" in the present embodiment means a joining portion in a case in which the tensile strengths of steel plates that are disposed adjacent to one another are the same, and "different material joining portion" means a joining portion in a case in which the tensile strengths of steel plates that are disposed adjacent to one another are different.

At the right side portion 14 in the transverse direction of the panel member 10, a front portion 28, a central portion (first plate member) 30 and a rear portion (second plate member) 32 are disposed adjacent to one another along the front-rear direction of the panel member 10. Ultrahigh tension steel plates whose tensile strengths are 980 MPa (so-called "980 materials") are used as the front portion 28 and the central portion 30. A high tension steel plate whose tensile strength is 440 MPa (a so-called "440 material") is used as the rear portion 32. Further, the front portion 28 and the central portion 30 are joined via a same material joining portion 34, and the central portion 30 and the rear portion 32 are joined via a different material joining portion (first joining portion) 36.

In the same way as at the right side portion 14, at the left side portion 16 in the transverse direction of the panel member 10, a front portion 38, a central portion (first plate member) 40 and a rear portion (second plate member) 42 are disposed adjacent to one another along the front-rear direction of the panel member 10. 980 materials are used as the front portion 38 and the central portion 40, and a 440 material is used as the rear portion 42. Further, the front portion 38 and the central portion 40 are joined via a same material joining portion 44, and the central portion 40 and the rear portion 42 are joined via a different material joining portion (first joining portion) 46.

As described above, the central portion 12 and the right side portion 14 in the transverse direction of the panel member 10 are joined via a different material joining portion (second joining portion) 18, and the central portion 12 and the left side portion 16 in the transverse direction of the panel member 10 are joined via a different material joining portion (second joining portion) 20.

Moreover, at the panel member 10, the position of the same material joining portion 26 at the central portion 12 in the transverse direction on the one hand, and the position of the same material joining portion 34 at the right side portion 14 and the position of the same material joining portion 44 at the left side portion 16 on the other hand, are offset in the front-rear direction of the panel member 10. Further, the position of the same material joining portion 26 at the central portion 12 in the transverse direction of the panel member 10 on the one hand, and the position of the different material joining portion 36 of the right side portion 14 and the position of the different material joining portion 46 of the left side portion 16 on the other hand, are offset in the front-rear direction of the panel member 10.

Figure 2:
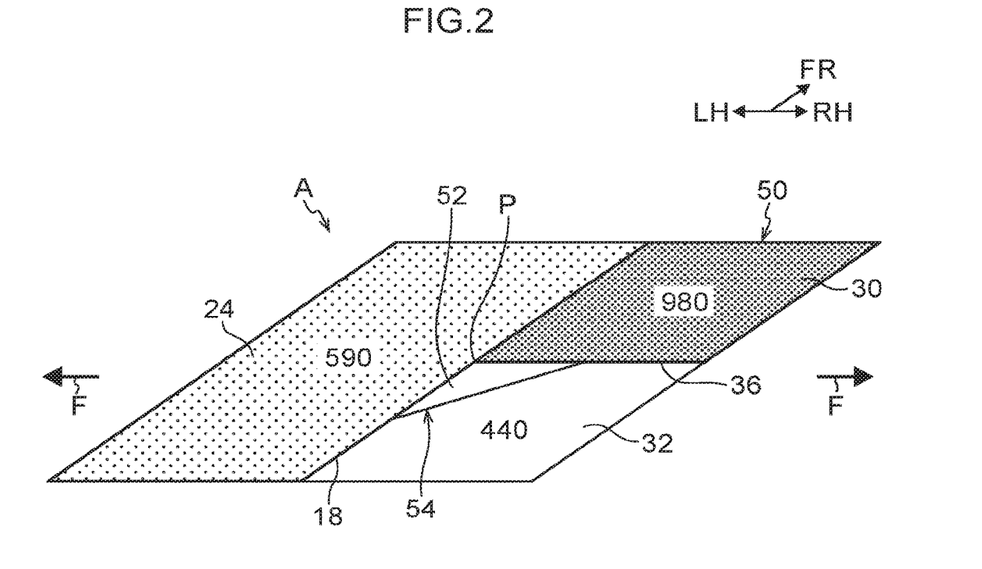
FIG. 2 is a partial, enlarged perspective view showing a state in which joined region A shown in FIG. 1 is enlarged.

An enlarged perspective view, in which joined region A (panel member 50) of the panel member 10 in FIG. 1 is enlarged, is shown in FIG. 2. As shown in this drawing, at the panel member 50, three types of steel plates having different tensile strengths are joined in a trifurcated shape in a state of being adjacent to and abutting one another.

As described above, the left portion of the panel member 50 (the rear portion (third plate member) 24 of the central portion 12 of the panel member 10 shown in FIG. 1) is formed of a 590 material, and the right side front portion of the panel member 50 (the central portion (first plate member) 30 of the right side portion 14 of the panel member 10 shown in FIG. 1) is formed of a 980 material. Further, the right side rear portion of the panel member 50 (the rear portion (second plate member) 32 of the right side portion 14 of the panel member 10 shown in FIG. 1) is formed of a 440 material.

Therefore, in the following description, the left portion of the panel member 50 shown in FIG. 2 is called an "intermediate strength steel plate 24", the right side front portion of the panel member 50 is called a "high strength steel plate 30" and the right side rear portion of the panel member 50 is called a "low strength steel plate 32". Note that a 440 material is generally a high tensile strength steel plate, but here, is called a "low strength steel plate" for convenience and based on evaluation relative to a 590 material, and is used in a sense that is different than low strength as an absolute meaning in view of the specifications thereof.

Further, here, as an example, steel plates of a plate thickness of 1.0 mm are used as the high strength steel plate 30 and the intermediate strength steel plate 24, and a steel plate of a plate thickness of 0.65 mm is used as the low strength steel plate 32. However, the plate thicknesses thereof are not particularly limited to these.

Further, in the present embodiment, the high strength steel plate 30 and the low strength steel plate 32 are joined via the different material joining portion 36. The high strength steel plate 30 and the low strength steel plate 32 on the one hand, and the intermediate strength steel plate 24 on the other hand, are joined via the different material joining portion 18. Moreover, at the low strength steel plate 32, a laser hardened portion (high strength portion) 54 that is formed by hardening by a laser is provided at a peak portion 52 that includes the different material joining portion 36 and the different material joining portion 18.

This laser hardened portion 54 includes intersection point (the vertex of the low strength steel plate 32) P of the different material joining portion 36 of the low strength steel plate 32 and the high strength steel plate 30, and the different material joining portion 18 that joins the low strength steel plate 32 and the high strength steel plate 30 with the intermediate strength steel plate 24, and the peripheral portion of this intersection point P. The laser hardened portion 54 is formed in a substantially triangular shape as seen in plan view, and laser hardening is carried out over the entire laser hardened portion 54.

(Operation and Effects of Panel Member for Automobile)

As shown in FIG. 2, at the low strength steel plate 32 of the panel member 50, as described above, the laser hardened portion 54 that is formed in a triangular shape as seen in plan view is provided at the peak portion 52 that includes the different material joining portion 36 and the different material joining portion 18. Laser hardening is carried out over the entirety of the laser hardened portion 54, and the material is made hard at the laser hardened portion 54 due to the hardening by a laser. Therefore, at the laser hardened portion 54, the tensile strength is higher than the tensile strength that the low strength steel plate 32 itself has.

Figure 3A:
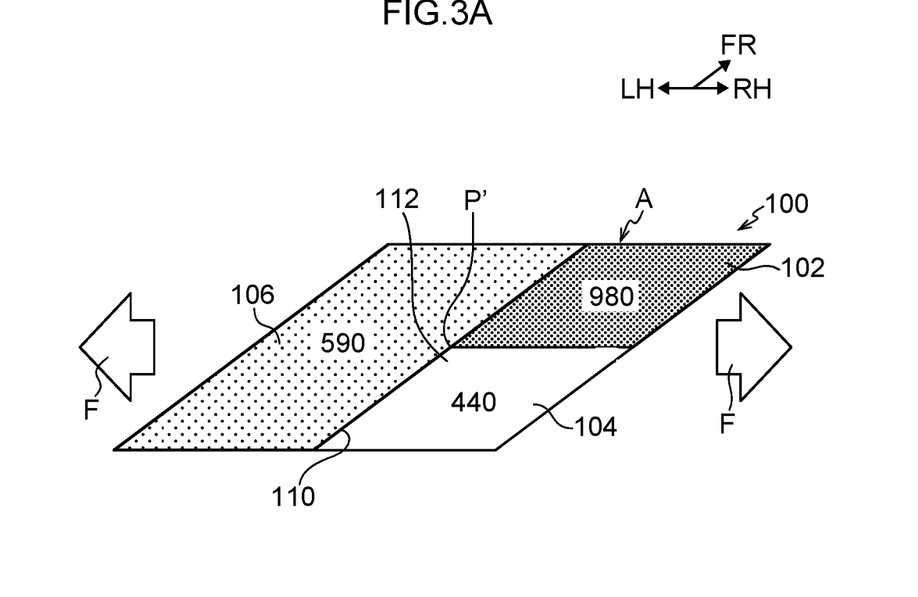
FIG. 3A is a partial, enlarged perspective view that corresponds to FIG. 2 and shows a comparative example.

Generally, in a case of tensing, under the same conditions, steel plates that have different tensile strengths, the amount of elongation of a steel plate whose tensile strength is low is greater than that of a steel plate whose tensile strength is high. On the basis thereof, a case is considered in which, as shown in FIG. 3A for example, at a panel member 100, a high strength steel plate 102 and a low strength steel plate 104 on the one hand, and an intermediate strength steel plate 106 on the other hand, whose tensile strengths all differ from one another are adjacent to one another and are joined in a trifurcated shape.

Figure 3B:
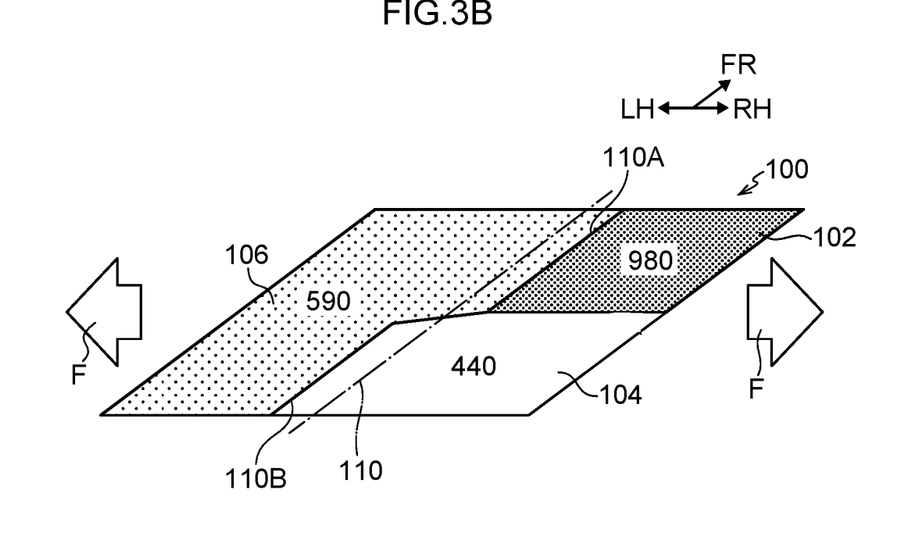
FIG. 3B is an explanatory drawing for explaining problematic points in FIG. 3A.

In this case, when tensile force F is applied along the direction orthogonal to the direction in which the high strength steel plate 102 and the low strength steel plate 104 are arrayed, as shown in FIG. 3B, at a different material joining portion 110, due to the difference in the amounts of elongation at the intermediate strength steel plate 106 and the high strength steel plate 102, the position of a different material joining portion 110A, at which the intermediate strength steel plate 106 and the high strength steel plate 102 are joined, and the position of a different material joining portion 110B, at which the intermediate strength steel plate 106 and the low strength steel plate 104 are joined, become offset in the direction of tensing.

As a result, the panel member 100 deforms in an S-shape. Namely, due to the forming that is carried out by press working, and the like, the formability of the panel member 100 deteriorates at the time when the panel member 100 is stamped. Note that, in FIG. 3B, the amount of deformation of the panel member 100 is shown to be larger than in actuality in order to make it easy to see the deformation of the panel member 100.

Further, as shown in FIG. 3B, at the panel member 100, in a case in which the position of the different material joining portion 110A, at which the intermediate strength steel plate 106 and the high strength steel plate 102 are joined, and the position of the different material joining portion 110B, at which the intermediate strength steel plate 106 and the low strength steel plate 104 are joined, become offset in the direction of tensing, at the low strength steel plate 104 side, vertex P' (refer to FIG. 3A), at which the high strength steel plate 102 and the intermediate strength steel plate 106 are joined, is the starting point of the position of the different material joining portion 110B becoming offset in the direction of tensing. Therefore, at a peak portion 112 side of the low strength steel plate 104, at the time of stamping of the panel member 100, stress concentrates, and there are cases in which local elongation (contraction) and breakage (cracking) arise.

In contrast, in the present embodiment, as shown in FIG. 2, the laser hardened portion 54 that is formed by hardening by a laser is provided at the peak portion 52 that includes the different material joining portion 36, that joins the high strength steel plate 30 and the low strength steel plate 32 that have different tensile strengths, and the different material joining portion 18 that joins the high strength steel plate 30 and the low strength steel plate 32 to the intermediate strength steel plate 24. Further, due thereto, at the three types of steel plates that have different tensile strengths (the high strength steel plate 30, the intermediate strength steel plate 24, the low strength steel plate 32), the peak portion 52 of the low strength steel plate 32 where stress concentrates at the time of stamping the panel member 50 and the like is reinforced, and optimization of the balance of strength is achieved.

Accordingly, at the panel member 50 of the present embodiment, by reinforcing the peak portion 52 of the low strength steel plate 32 that is the starting point of the offset in the direction of tensing between the high strength steel plate 30 and the low strength steel plate 32, the amount of extension at the low strength steel plate 32 can be made to be small locally as compared with a case in which the laser hardened portion 54 is not provided at the low strength steel plate 32. As a result, the amount of deformation at the panel member 50 can be made to be small, the concentration of stress that is applied to the low strength steel plate 32 can be mitigated, and breakage (cracking) at the time of stamping can be suppressed at the panel member 50.

Further, in the present embodiment, as shown in FIG. 2, the laser hardened portion 54 includes the peak portion 52 of the low strength steel plate 32, and is formed in a triangular shape as seen in plan view. Generally, when the tensile force F is applied to the panel member 50, at the low strength steel plate 32, stress concentrates in particular at the peak portion 52 which is where the intermediate strength steel plate 24 and the high strength steel plate 30, whose coefficients of extension differ from one another, abut one another.

Therefore, due to the laser hardened portion 54 including the peak portion 52 of the low strength steel plate 32 and being formed in a triangular shape, the region, at which stress concentrates in particular at the time when the tensile force F is applied to the panel member 50, is reinforced. At the panel member 50, breakage (cracking) that arises at the time of stamping can be suppressed effectively.

Moreover, in the present embodiment, the laser hardened portion 54 is provided as a high strength portion at the peak portion 52 of the low strength steel plate 32. By making the peak portion 52 be a high strength portion by laser hardening in this way, hardening can be carried out at the needed region. Further, generally, in the hardening of a steel plate by a laser, the steel plate hardens due to self-cooling, and a cooling agent is not needed.

The panel member 10, which is shown in FIG. 1 and includes the panel member 50 that is formed as described above, is applied to, for example, the floor panel of a vehicle. Note that, in the case of application as a floor panel, although not illustrated, the central portion 12 in the transverse direction of the panel member 10 is made to be the tunnel portion, and the right side portion 14 and the left side portion 16 are respectively made to be floor portions. Therefore, in the press working, the central portion 12 of the panel member 10 is made to protrude upward. Note that the panel member 10 can be applied to door members in addition to floor panels, and the size and the structure of the panel member 10 are not limited to these.

Generally, when increasing the strength of a steel plate, the material of the steel plate changes, and therefore, costs increase by that much. Further, when increasing the rigidity of a steel plate, the plate thickness is made to be thicker, and therefore, when the steel plate is used as a panel member for an automobile, it leads to an increase in the weight of the automobile, and the fuel economy deteriorates. In view of the above, the tensile strength and the plate thickness of the steel plate are not limited to those of the present embodiment, and are changed appropriately in consideration of the balance between the strength and rigidity that are required in light of the specifications of the vehicle.

Further, as described above, by applying the panel member 50 (see FIG. 2) of the present embodiment, the mechanical characteristics can be varied locally in accordance with the specifications of the panel member 10 (see FIG. 1). Therefore, lightening of the weight of the vehicle is achieved, and a reduction in costs can be realized.

Other Embodiments

In the present embodiment, as shown in FIG. 2, at the laser hardened portion 54, laser hardening is carried out over the entire laser hardened portion 54, but the present invention is not limited to this.

Figure 4A:
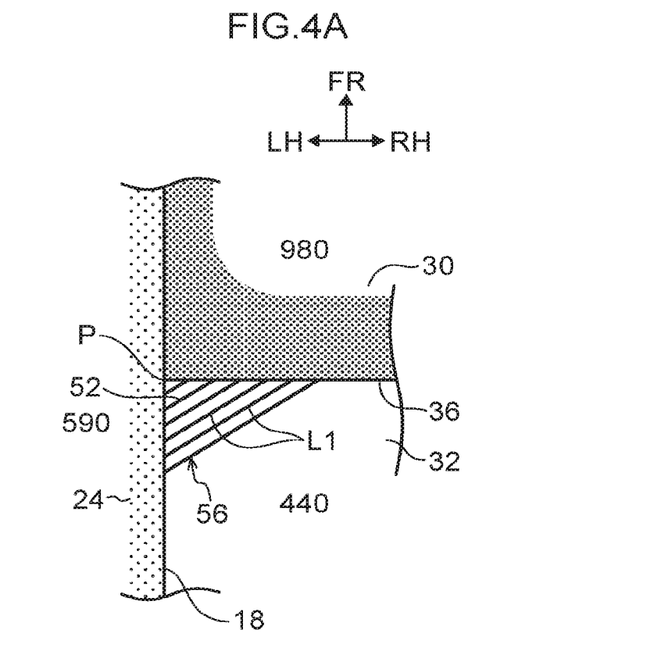
FIG. 4A is a plan view showing modified example (1) of a laser hardened portion shown in FIG. 2.

(1) For example, as shown in FIG. 4A, laser hardening may be carried out along a direction intersecting the different material joining portion 18 and the different material joining portion 36, and a laser hardened portion 56 may be formed by plural laser hardened lines (first laser hardened lines) L1.

Due thereto, laser hardening can be carried out at the needed regions, and, as compared with a case in which the laser hardened lines L1 are not formed, elongation at the low strength steel plate 32 can be suppressed due to the suppression, via the different material joining portion 18 and the different material joining portion 36, of elongation that is in the directions running along the different material joining portion 18 and the different material joining portion 36. As a result, the amount of deformation at the panel member 50 can be made to be small, and, at the peak portion 52 of the low strength steel plate 32 at the panel member 50, a concentration of stress at the time of stamping can be mitigated, and breakage (cracking) can be suppressed.

Figure 4B:
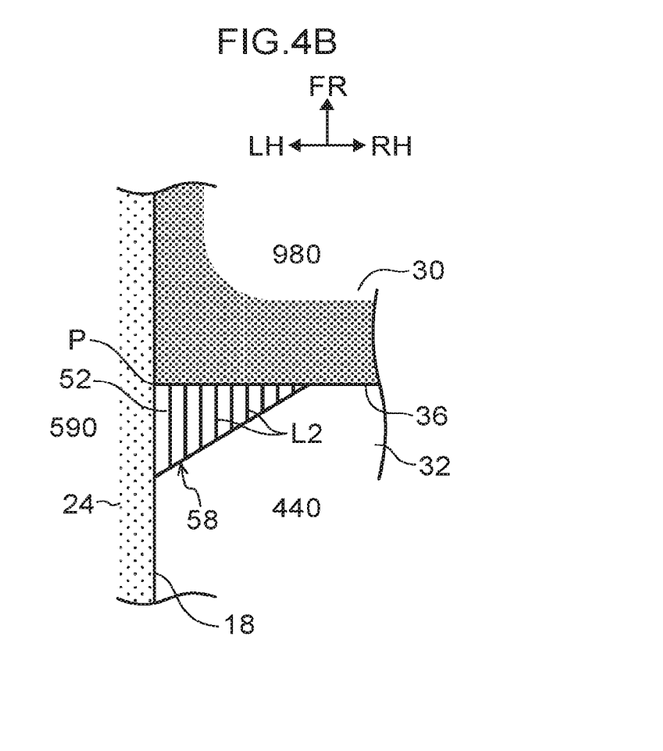
FIG. 4B is a plan view showing modified example (2) of the laser hardened portion shown in FIG. 2.

(2) Further, other than this, laser hardening may be carried out along a direction intersecting at least the different material joining portion 36, and a laser hardened portion 58 may be formed by plural laser hardened lines (second laser hardened lines) L2.

To describe this concretely, as shown in FIG. 4B, at the peak portion 52 of the low strength steel plate 32, the laser hardened lines L2 intersect the different material joining portion 36 that is joined to the high strength steel plate 30, and are formed parallel to the different material joining portion 18 that is joined to the intermediate strength steel plate 24.

By forming the laser hardened lines L2 along the direction intersecting the different material joining portion 36 in this way, at the peak portion 52 of the low strength steel plate 32, elongation in the direction along the different material joining portion 36 at the time of stamping can be suppressed via the different material joining portion 36. Moreover, due to the laser hardened lines L2 being formed parallel to the different material joining portion 18, elongation in the direction along the different material joining portion 36 can be suppressed at the peak portion 52 itself of the low strength steel plate 32.

Figure 4C:
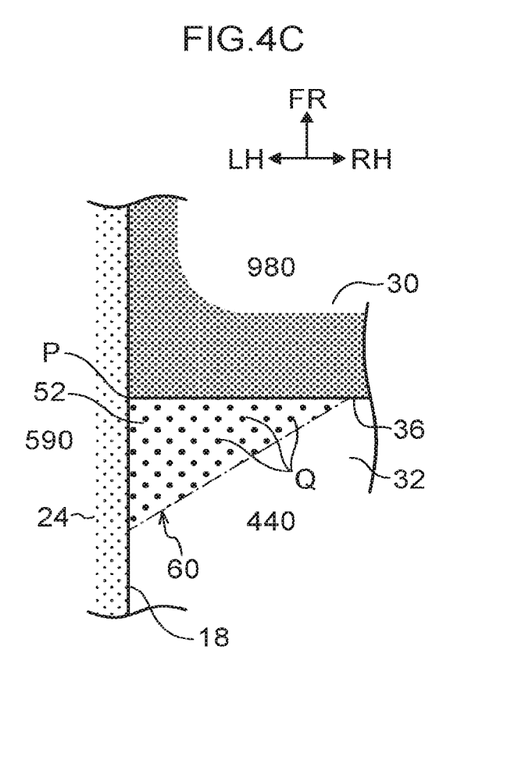
FIG. 4C is a plan view showing modified example (3) of the laser hardened portion shown in FIG. 2.

(3) Note that the present invention is not limited to the laser hardened lines L1 and the laser hardened lines L2 that are shown in FIG. 4A and FIG. 4B. As shown in FIG. 4C, laser hardened portions 60 may be formed by carrying out hardening in the form of dots by plural laser points Q.

(4) Further, in the present embodiment, as shown in FIG. 2, at the panel member 50, the high strength steel plate 30 and the low strength steel plate 32 are joined via the different material joining portion 36, and the high strength steel plate 30 and the low strength steel plate 32 are joined to the intermediate strength steel plate 24 via the different material joining portion 18. Further, at the low strength steel plate 32, the laser hardened portion (high strength portion) 54 is provided at the peak portion 52 that includes the different material joining portion 36 and the different material joining portion 18, but the present invention is not limited to this.

Figure 5:
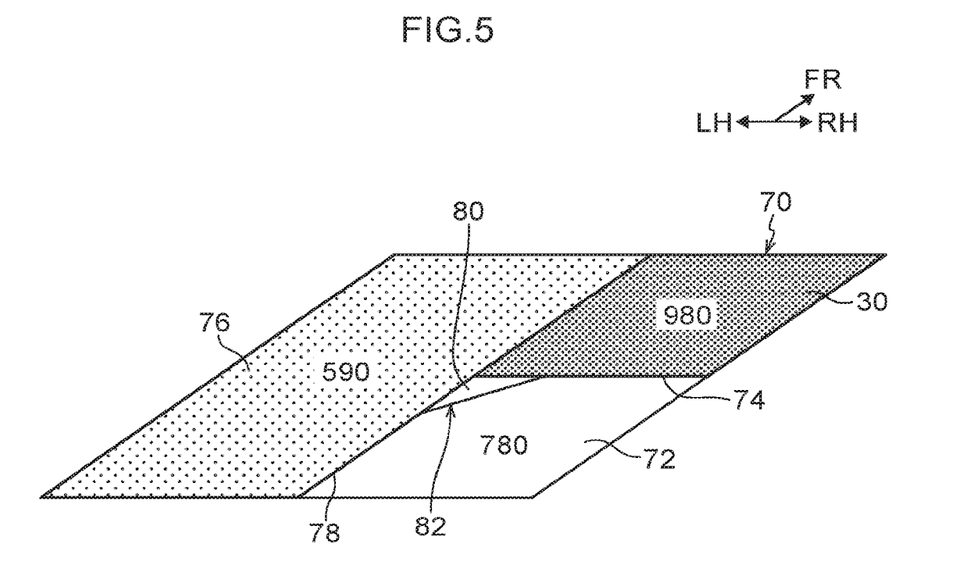
FIG. 5 is a partial, enlarged perspective view that corresponds to FIG. 2 and shows modified example (4) of the panel member for an automobile relating to the present embodiment.

For example, as shown in FIG. 5, in the present embodiment, the high strength steel plate 30 and an intermediate strength steel plate (second plate member) 72 are adjacent to one another at a panel member 70. Note that a high tension steel plate material whose tensile strength is 780 MPa (a so-called "780 material") is used as the intermediate strength steel plate 72 here. Further, the high strength steel plate 30 and the intermediate strength steel plate 72 are joined via a different material joining portion (third joining portion) 74. The high strength steel plate 30 and the intermediate strength steel plate 72 on the one hand, and a low strength steel plate (third plate member) 76 on the other hand, are joined via a different material joining portion (fourth joining portion) 78 that intersects the different material joining portion 74.

Note that, a high tension steel plate material of a tensile strength of 590 MPa is used as the low strength steel plate 76 here. Here, in the embodiment shown in FIG. 2, a 590 material is the intermediate strength steel plate, but, in the embodiment shown in FIG. 5, a 590 material is the low strength steel plate in relation to the other steel materials. Namely, as explained previously, the terms "low strength steel plate", "intermediate strength steel plate" and "high strength steel plate" are used for convenience and based on evaluation relative to the other steel plates, and are used in a sense that is different than low strength, intermediate strength and high strength as absolute meanings in view of the specifications thereof.

Further, in the present embodiment, a laser hardened portion 82 is provided at the intermediate strength steel plate 72 at a peak portion 80 that includes the different material joining portion 74 and the different material joining portion 78. Namely, in the present invention, among the three different types of steel plates, laser hardening is not carried out on the steel plate that has the lowest tensile strength, and the steel plate that is subjected to laser hardening changes in accordance with the tensile strengths and the plate thicknesses of the adjacent steel plates, and the tensile force that is applied at the time of press working, and the like.

(5) Further, in the present embodiment, as shown in FIG. 2, the laser hardened portion 54 is provided at the peak portion 52 of the low strength steel plate 32 at the panel member 50. However, the present invention is not limited to this because it suffices to be able to suppress breakage (cracking) at the time of stamping at the low strength steel plate whose tensile strength is low.

Figure 6:
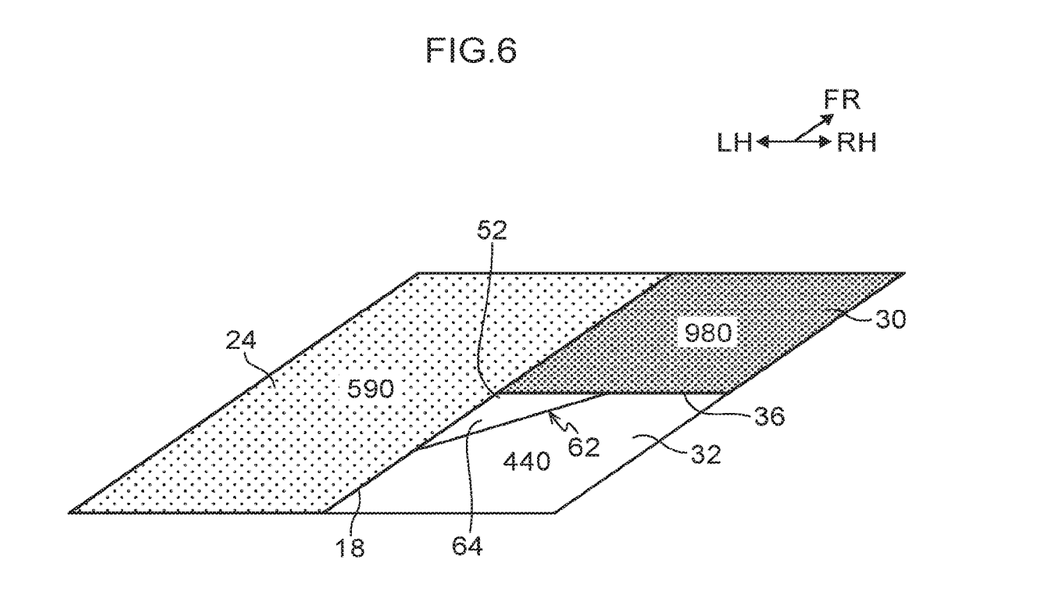
FIG. 6 is a partial, enlarged perspective view that corresponds to FIG. 2 and shows modified example (5) of the panel member for an automobile relating to the present embodiment.

For example, at a high strength portion 62 shown in FIG. 6, a reinforcing steel plate 64, whose tensile strength is higher than the tensile strength at the low strength steel plate 32, is joined. Note that the reinforcing steel plate 64 may be joined by being superposed on the peak portion 52 of the low strength steel plate 32, or may be joined to the low strength steel plate 32 in a state in which the peak portion 52 of the low strength steel plate 32 has been cut down. However, in these case, because the reinforcing steel plate 64 is joined to the peak portion 52 of the low strength steel plate 32, that much more work is required as compared with a case in which laser hardening is carried out, but the mechanical characteristics can be locally varied at a portion of the low strength steel plate 32.

The above-described present embodiment describes steel plates as examples of the plate members that are used at the panel member 10, but the plate member is not limited to a steel plate. For example, a plate member that is formed of an aluminum alloy or the like may be used.

Further, in the present embodiment, plate members whose tensile strength is 980 MPa are used as the ultra high tension steel plate members, and plate members whose tensile strengths are 780 MPa, 590 MPa, 440 MPa are used as the high tension steel plate members. However, the tensile strengths are not limited to these, and can be changed appropriately in accordance with the vehicle type or the like.

Here, the present embodiment describes an example in which materials of respectively different tensile strengths are used as the three types of plate members (steel plates), but the present invention is not limited to this. For example, a material that is the same as the first plate member or the second plate member may be used for the third plate member.

Further, as shown in FIG. 2, the laser hardened portion 54 is formed in a triangular shape in plan view in the present embodiment, but the present invention is not limited to this. The laser hardened portion may be formed in a rectangular shape or a diamond shape for example, and can be changed appropriately in accordance with the shape of the drawing working or the like.

Moreover, as shown in FIG. 1, the joining portions, which include the different material joining portions 18, 36, are formed as straight lines in the present embodiment. However, these joining portions are not limited to straight lines, and may be curves. Accordingly, the shapes of the steel plates are not limited to rectangular shapes.

An example of an embodiment of the present invention has been described above, but embodiments of the present invention are not limited to the above, and the embodiment and any of the various modified examples can be utilized by being combined appropriately. Further, the present invention can, of course, be implemented in various forms within a scope that does not depart from the gist thereof.

What is claimed is:

1. A panel member for an automobile comprising:
a first plate member that is made of metal;
a second plate member that is made of metal, and is joined to the first plate member via a first joining portion in a state of being adjacent to the first plate member, a tensile strength of the second plate member being lower than a tensile strength of the first plate member;
one or more third plate members that are made of metal, and that are joined to the first plate member and the second plate member via a second joining portion that intersects the first joining portion in a state of being adjacent to the first plate member and the second plate member; and
a high strength portion that is provided at the second plate member, and that includes a peak portion including the first joining portion and the second joining portion, a tensile strength of the high strength portion being higher than the tensile strength of the second plate member.

2. The panel member for an automobile of claim 1, wherein the high strength portion that includes the peak portion is formed in a triangular shape.

3. The panel member for an automobile of claim 1, wherein the high strength portion is a laser hardened portion that is hardened by a laser.

4. The panel member for an automobile of claim 3, wherein the laser hardened portion includes a first laser hardened line that is formed along a direction intersecting the first joining portion and the second joining portion.

5. The panel member for an automobile of claim 3, wherein the laser hardened portion includes a second laser hardened line that intersects the first joining portion and is parallel to the second joining portion.

6. The panel member for an automobile of claim 1, wherein, at the high strength portion, a reinforcing plate member, whose tensile strength is higher than the tensile strength of the second plate member, is joined to the second plate member.

7. The panel member for an automobile of claim 3, wherein the laser hardened portion includes a plurality of laser hardened lines that are parallel to one another.

8. The panel member for an automobile of claim 3, wherein the laser hardened portion is formed in a plurality of dot shapes.

9. The panel member for an automobile of claim 1, wherein the one or more third plate member is disposed along a front-rear direction at a center in a transverse direction of the panel member for an automobile, the first plate member and the second plate member are disposed along the front-rear direction at a left side and a right side in the transverse direction of the panel member for an automobile respectively, and the first plate member is disposed further toward a front side than the second plate member.

10. The panel member for an automobile of claim 9, wherein a tensile strength of the third plate member is lower than that of the first plate member and higher than that of the second plate member.

11. The panel member for an automobile of claim 9, wherein a tensile strength of the third plate member is lower than those of the first plate member and the second plate member.

* * * * *